United States Patent
Booth et al.

(10) Patent No.: US 10,733,451 B2
(45) Date of Patent: Aug. 4, 2020

(54) AUTOMATIC LICENSE PLATE RECOGNITION SYSTEM AND METHOD THEREFOR

(71) Applicant: Avigilon Corporation, Vancouver (CA)

(72) Inventors: Daniel James Booth, Vancouver (CA); Thanh Tam Ho, Vancouver (CA); Jinsong Zhu, Port Moody (CA)

(73) Assignee: AVIGILON CORPORATION, Vancouver (CA)

( * ) Notice: Subject to any disclaimer, the term of this patent is extended or adjusted under 35 U.S.C. 154(b) by 329 days.

(21) Appl. No.: 15/988,353

(22) Filed: May 24, 2018

(65) Prior Publication Data

US 2019/0347487 A1    Nov. 14, 2019

Related U.S. Application Data

(60) Provisional application No. 62/669,880, filed on May 10, 2018.

(51) Int. Cl.
    *G06K 9/00*    (2006.01)
    *H04N 7/18*    (2006.01)
    *G06K 9/32*    (2006.01)

(52) U.S. Cl.
    CPC ......... *G06K 9/00744* (2013.01); *G06K 9/325* (2013.01); *H04N 7/181* (2013.01); *G06K 2209/15* (2013.01)

(58) Field of Classification Search
    CPC ............... G06K 9/00744; G06K 9/325; G06K 2209/15; H04N 7/181
    See application file for complete search history.

(56) References Cited

U.S. PATENT DOCUMENTS

| 7,382,277 B2 | 6/2008 | Ioli |
| 8,004,563 B2 | 8/2011 | Talmon et al. |

(Continued)

FOREIGN PATENT DOCUMENTS

WO    2015/198299 A1    12/2015

OTHER PUBLICATIONS

Wilgenburg, Jeroen Van, "Spark Streaming Backpressure—Finding the Optimal Rate is Now Done Automatically," Oct. 6, 2015, <https://vanwilgenburg.wordpress.com/2015/10/06/spark-streaming-backpressur/>.

*Primary Examiner* — Yon J Couso
(74) *Attorney, Agent, or Firm* — Daniel Hammond (57) ABSTRACT

An n-lane automatic license plate recognition system (where n is an integer greater than one) and a method for dropping video frames in this system is disclosed. The method includes receiving, at an input of a first stage of a two-stage restrictor, a plurality of video frames. In the first stage of the two-stage restrictor, a subset of the plurality of video frames is dropped. An output of the first stage is coupled to an input of a second stage of the two-stage restrictor such that receiving and non-receiving of individual ones the plurality of video frames by the second stage is controlled by the first stage. In the second stage after the first stage, a further subset of the plurality of video frames is dropped to effect controlled frame input into a processor that performs at least one recognition analytic on remaining video frames of the plurality of video frames. The dropping of the further subset is based on at least one drop condition including a lane-specific drop condition.

11 Claims, 7 Drawing Sheets

(56) References Cited

U.S. PATENT DOCUMENTS

| | | |
|---|---|---|
| 8,027,256 B1 | 9/2011 | Subramanian et al. |
| 2005/0151671 A1* | 7/2005 | Bortolotto .............. G08G 1/054 340/936 |
| 2014/0028842 A1* | 1/2014 | Abramson ......... G06K 9/00785 348/143 |
| 2016/0144788 A1* | 5/2016 | Perrin, III ................ B60R 1/00 348/148 |
| 2017/0192423 A1* | 7/2017 | Rust .................. G01C 21/3492 |

* cited by examiner

FIG. 7

AUTOMATIC LICENSE PLATE RECOGNITION SYSTEM AND METHOD THEREFOR

RELATED U.S. APPLICATION DATA

The present application claims the benefit of priority of provisional application No. 62/669,880 filed on May 10, 2018, the content of which is hereby incorporated by reference in its entirety.

FIELD

The present subject-matter relates to an automatic license plate recognition system and, in particular, to two-stage dynamic throttling in an automatic license plate recognition system.

BACKGROUND

Automatic License Plate Recognition (ALPR) is a technology that uses optical character recognition on images to read vehicle registration plates to create vehicle location data. ALPR can use existing closed-circuit television, road-rule enforcement cameras, or cameras specifically designed for the task. ALPR can be used to store the images captured by the cameras as well as the text from the license plate.

In the security and surveillance industry, the so-called Video Management System (VMS) is well known. Typically the VMS is a component of a larger security system. In general, the VMS: collects video from cameras and other sources; records/stores that video to a storage device; and provides an interface to both access recorded video and view live video.

SUMMARY

According to one example embodiment, there is provided a method for dropping video frames in an n-lane automatic license plate recognition system (where n is an integer greater than one). The method includes receiving, at an input of a first stage of a two-stage restrictor, a plurality of video frames. In the first stage of the two-stage restrictor, a subset of the plurality of video frames is dropped. An output of the first stage is coupled to an input of a second stage of the two-stage restrictor such that receiving and non-receiving of individual ones the plurality of video frames by the second stage is controlled by the first stage. In the second stage after the first stage, a further subset of the plurality of video frames is dropped to effect controlled frame input into a processor that performs at least one recognition analytic on remaining video frames of the plurality of video frames. The dropping of the further subset is based on at least one drop condition including a lane-specific drop condition.

According to another example embodiment, there is provided an automatic license plate recognition system for deployment within n lanes of vehicle traffic, where n is an integer greater than one. The system includes n cameras. Each of the n cameras is configured to monitor a respective one of the n lanes of vehicle traffic and generate video data. The system also includes a video management system communicatively coupled to the n cameras to receive the video data therefrom. The video management system includes at least one tangible, non-transitory, computer-readable storage medium having instructions encoded therein, wherein the instructions, when executed by at least one processor, cause a carrying out of a two-stage restricting method. An output of a first stage of the two-stage restricting undergoes additional restricting in a second stage of the two-stage restricting such that receiving and non-receiving, by the second stage, of individual ones a plurality of video frames, derived from the video data, is controlled by the first stage. The two-stage restricting method includes first dropping, in the first stage of restricting, a subset of the plurality of video frames. The two-stage restricting method also includes second dropping, in the second stage after the first stage, a further subset of the plurality of video frames to effect controlled frame input into a processor that performs at least one recognition analytic on remaining video frames of the plurality of video frames. The dropping of the further subset based on at least one drop condition includes a lane-specific drop condition.

BRIEF DESCRIPTION OF THE DRAWINGS

Reference will now be made, by way of example, to the accompanying drawings.

Similar or the same reference numerals may have been used in different figures to denote similar example features illustrated in the drawings.

DETAILED DESCRIPTION OF EXAMPLE EMBODIMENTS

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to embodiments of the invention. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

Figure 1:
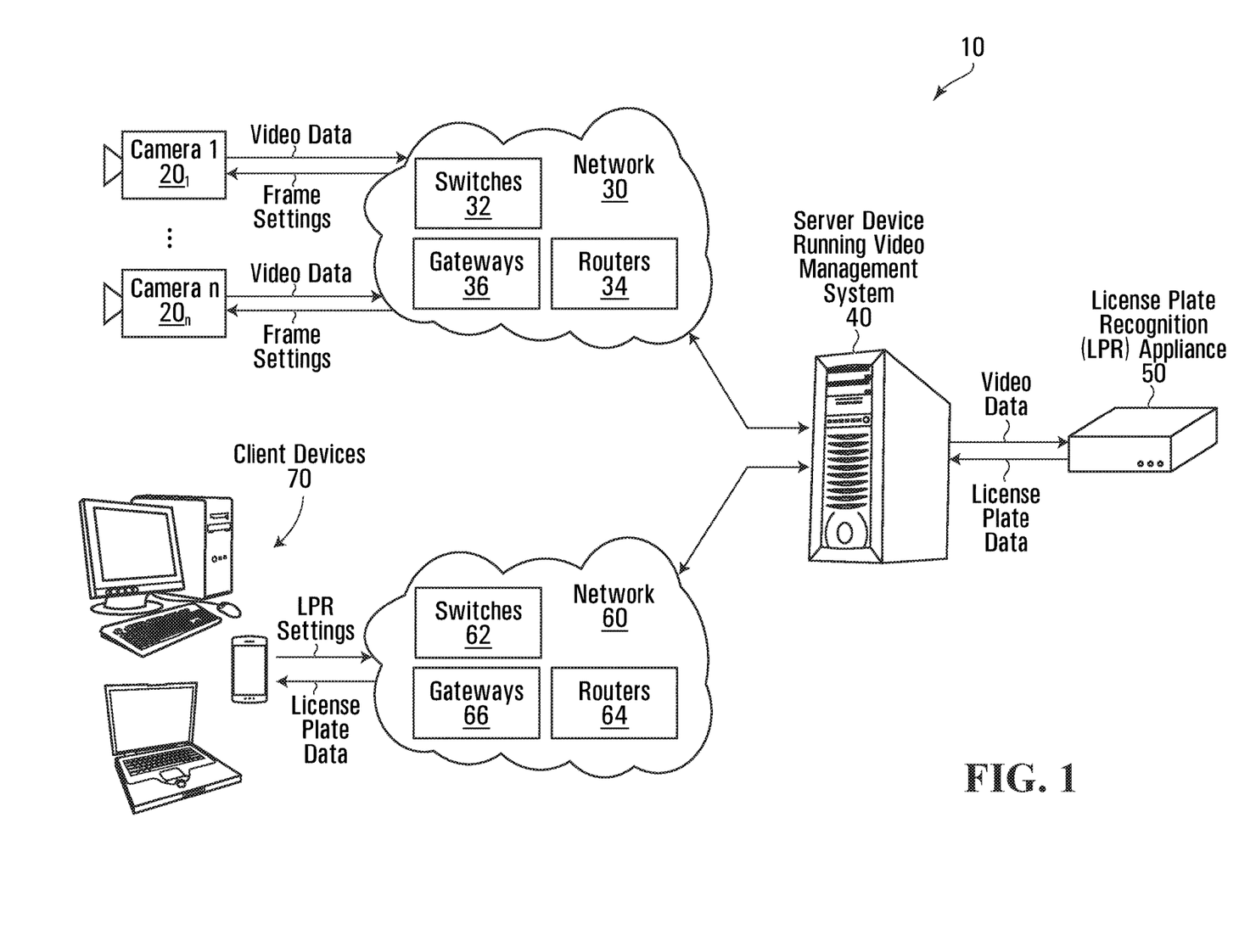
FIG. 1 shows a block diagram of an ALPR system in accordance with example embodiments.

Reference is now made to FIG. 1 which is a block diagram of an ALPR system 10. The illustrated ALPR system 10 includes a plurality of cameras $20_1$-$20_n$ which are coupled to a network 30 (which may comprise a plurality of networks, even though shown as a single network in FIG. 1 for convenience of illustration). The network 30 can include the Internet, or one or more other public/private networks coupled together by communication elements: for example, one or more network switches 32, one or more routers 34, and/or one or more gateways 36. The network 30 could be of the form of, for example, client-server networks, peer-to-peer networks, etc. Data connections between any of the cameras $20_1$-$20_n$ and other network devices can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the cameras $20_1$-$20_n$ and the other illustrated network devices are within the same Local Area Network (LAN).

Still with reference to FIG. 1, the cameras $20_1$-$20_n$ communicate data and information to and from other network devices via the network 30. Two examples of such data and information, amongst other examples, are shown for convenience of illustration. For instance, the cameras $20_1$-$20_n$ transmit video data to one or more other network devices via the network 30. As another example, the cameras $20_1$-$20_n$ receive frame settings (control information) from other network devices via the network 30.

Also shown in FIG. 1 is a VMS server 40 which is coupled to the network 30 to receive data and information from other devices on the network 30 such as, for example, any of the cameras $20_1$-$20_n$. The VMS server 40 is also coupled to any suitable number of client devices 70 via a network 60 in order that the VMS server 40 may, for example, receive License Plate Recognition (LPR) settings information from the client devices 70, transmit license plate data to the client devices 70, etc.

Regarding the network 60, this may comprise a plurality of networks even though shown as a single network in FIG. 1 for convenience of illustration. The network 60 can include the Internet, or one or more other public/private networks coupled together by communication elements: for example, one or more network switches 62, one or more routers 64, and/or one or more gateways 66. The network 60 could be of the form of, for example, client-server networks, peer-to-peer networks, etc. Data connections between any of the client devices 70 and other network devices can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). Although in the illustrated example embodiment the network 30 and the network 60 are shown as separate, in some examples there may be some overlap and commonality between the network 30 and the network 60. In at least one example, the network 60 and the network 30 may be the same network.

Still with reference to FIG. 1, also within the ALPR system 10 is an LPR appliance 50. The LPR appliance 50 is coupled to the VMS server 40 for bi-direction communication therewith. For example, video data may be transmitted from the VMS server 40 to the LPR appliance 50 for processing therein. As another example, license plate data obtained from processed video data may be transmitted from the LPR appliance 50 to the VMS server 40. Also, it will be understood that although the LPR appliance 50 and the VMS server 40 are shown as separate devices in FIG. 1, in some examples there is instead a single server machine that provides the combined functionality of the LPR appliance 50 and the VMS server 40. Those skilled in the art will have detailed knowledge of software and hardware typically found in the LPR appliance 50. For example, the LPR appliance 50 includes an LPR engine. The LPR engine of the LPR appliance 50 carries out varies LPR-related functions including, for example, license plate localization, license plate sizing and orientation (adjusting), normalization, character segmentation, Optical Character Recognition (OCR) and syntactical/geometrical analysis.

Figure 2:
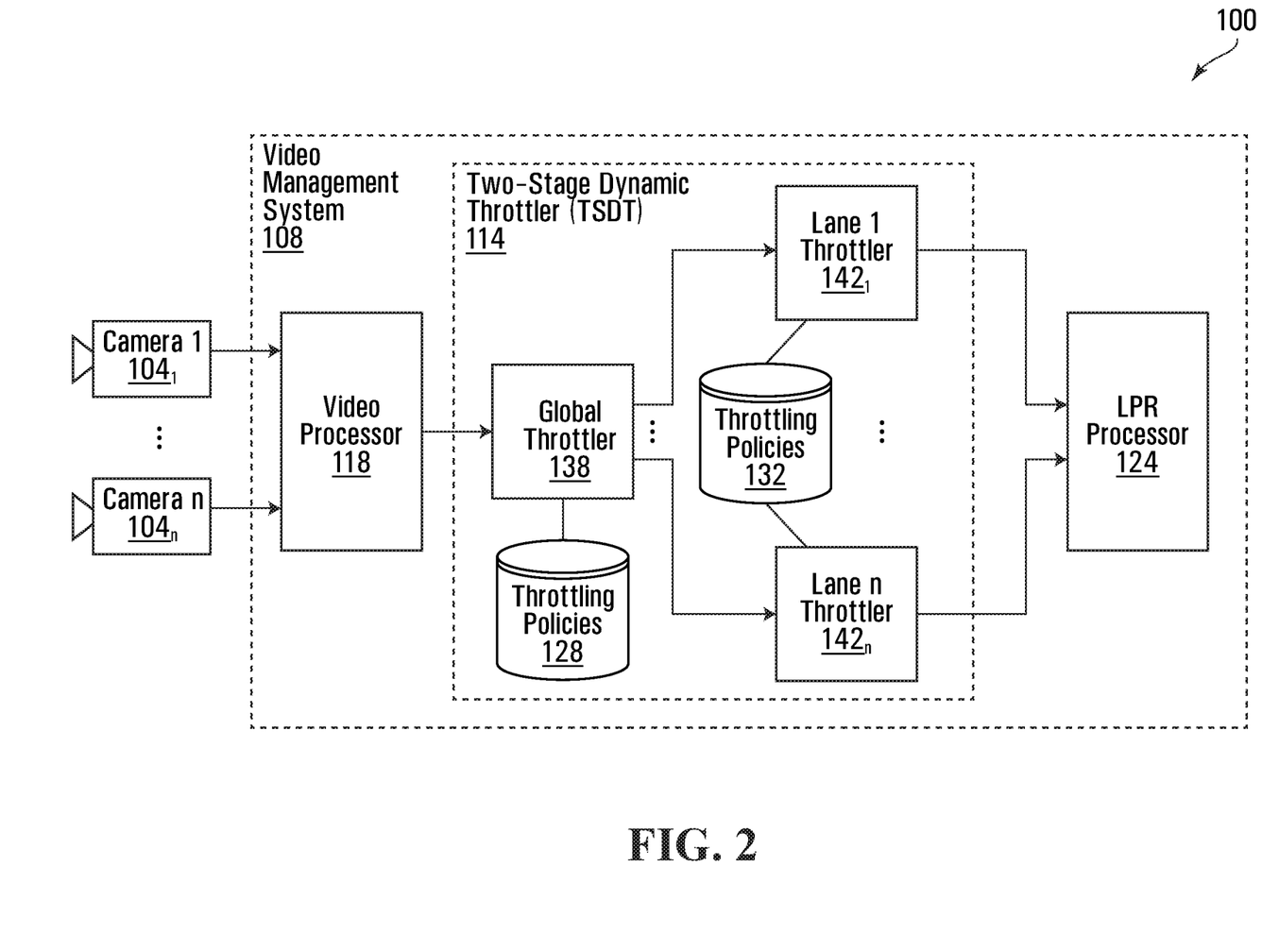
FIG. 2 shows another block diagram illustrating, with respect to an ALPR system which can be similar or the same as the ALPR system shown in FIG. 1, details of system aspects different than those system aspects illustrated in FIG. 1.

Reference is now made to FIG. 2 which is a block diagram of an ALPR system 100 in accordance with at least one example embodiment. The illustrated ALPR system 100 can be seen to correspond to the ALPR system 10 (once the following are noted): VMS 108 corresponds to (and shows different details of) the LPR appliance 50 and the VMS server 40 of FIG. 1, and the networks 30 and 60 are omitted for convenience of illustration.

Still with reference to FIG. 2, the ALPR system 100 includes a plurality of cameras $104_1$-$104_n$ which are coupled to a VMS 108. In one example, the VMS 108 may be a commercially known product (examples of which may include Avigilon Control Center™, Milestone's XProtect™, etc.) along with its immediate computing and processing environment. Residing and included within the VMS 108 is a two-stage dynamic restrictor or Two-Stage Dynamic Throttler (TSDT) 114. The VMS 108 also includes a number of processors including illustrated video processor 118 and LPR processor 124. As shown in FIG. 2, the TSDT 114 takes, as input, the output of the video processor 118 (which performs decoding in the illustrated example embodiment). The output of TSDT 114 is received by the LPR Processor 124 for eventual license plate recognition. Throttling policies are persisted in storages 128 and 132, accessible to the TSDT 114. In at least one example, storages 128 and 132 are realized as of one or more hard drives and/or other non-volatile storage devices contained within the VMS server 40 (FIG. 1) which also contains one or more processors that implement the TSDT 114. In such at least one example, and consistent with FIG. 1, the LPR processor may be contained within the LPR appliance 50.

The illustrated TSDT 114 has two cascaded stages: i) global restrictor or throttler 138; and ii) a plurality of lane restrictors or throttlers $142_1$-$142_n$. In the first stage, video frames from all lanes are funneled into a controller of the global throttler 138. General policies regarding frame throttling are predefined (via configuration) and applied to the video frames for enforcement. Examples of global throttling policies include: whether to only process key frames, or whether to process all frames; definition of resource threshold for throttling (over which throttling is triggered); criteria for dropping frames (random or other schemes such as dropping oldest frames).

The first stage in the TSDT 114 ensures that computing resources are sufficient to process the arriving frames without causing system stability issues or crashes. Examples of such computing resources include, for example, i) memory; and ii) Interprocess Communications bandwidth as between the TSDT 114 and the LPR processor 124. The threshold can be dynamically adjusted depending on the number of frames queued in the global throttler 138 (as back pressured from the LPR Processor 124 via a sending queue which is consumed by the LPR Processor 124).

Details of a global throttling method in accordance with an example embodiment will now be described.

Listed in Table 1 below are relevant variables for global throttling.

TABLE 1

Relevant Variables for Global Throttling

| Variable | Description |
| --- | --- |
| Mmin | Lower bound of memory usage (set in throttling policy) |
| Mmax | Upper bound of memory usage (set in throttling policy) |
| U | Current usage of memory |
| P | Drop probability (probability of dropping a frame) |

Figure 3:
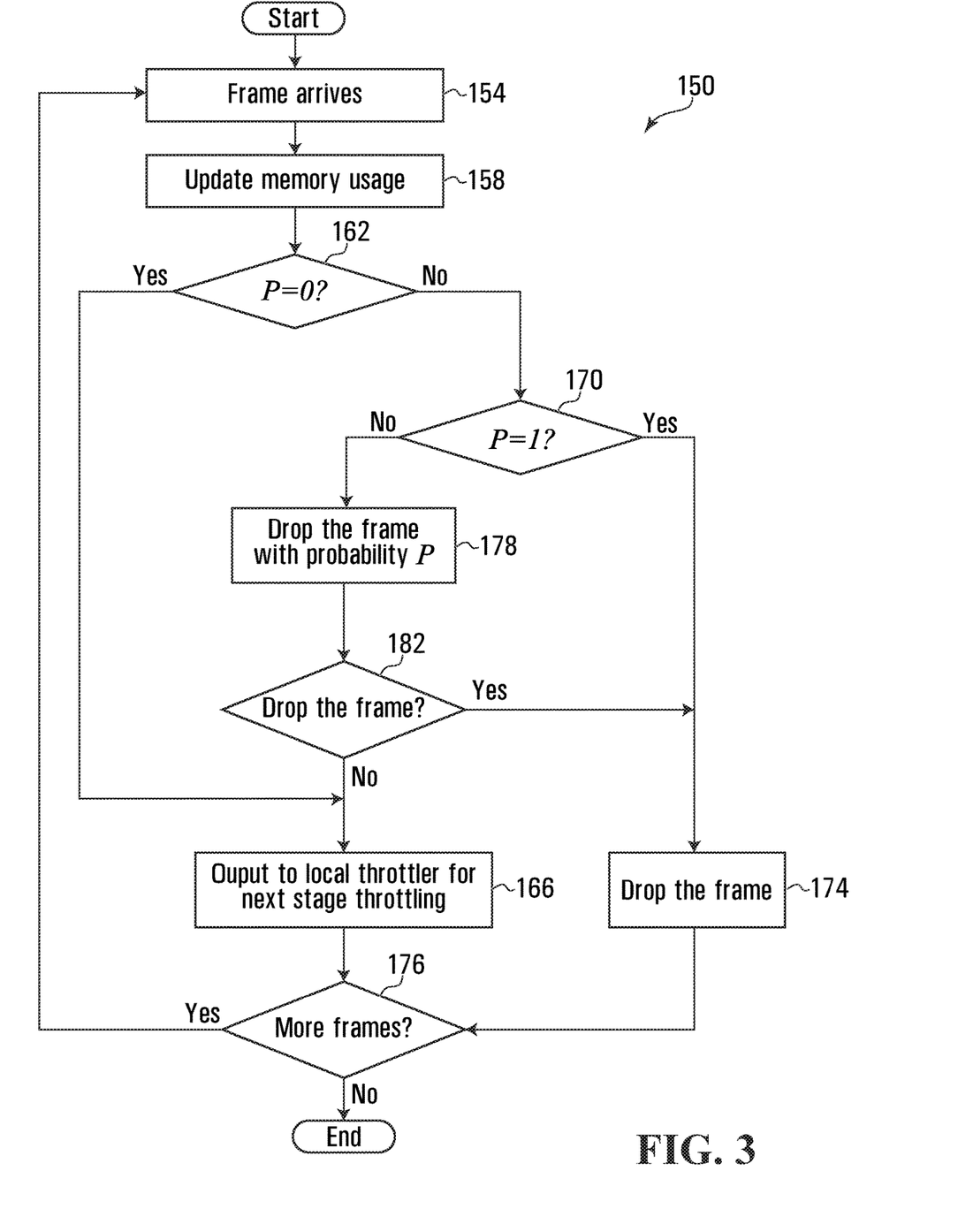
FIG. 3 is a flow chart illustrating a method for dropping frames for global throttling in accordance with an example embodiment.

Reference will now be made to FIG. 3. FIG. 3 is a flow chart of a method 150 for dropping frames for global throttling in accordance with the presently described example embodiment. Evident from the flow chart is the following: when the next frame arrives, the current drop probability (updated dynamically based on LPR requests and acknowledgements) is used to determine how the frame should be handled.

More detail of the method 150 will now be described. When a frame arrives (154) at the global throttler 138, it triggers an LPR Request. Let the memory used by the request be $U_{req}$. On receiving a request, the throttler updates the memory usage (158) to: $U=U+U_{req}$. After the request is acknowledged by the LPR Processor, the memory usage becomes $U=U-U_{req}$. In both cases (receiving or acknowledging), the drop probability is calculated as:

$$P=(U-M_{min})/(M_{max}-M_{min})$$

Boundary Conditions:

If $U \leq M_{min}$, $P=0$;

If $U \geq M_{max}$, $P=1$.

Still with reference to FIG. 3, P is checked (162) to see whether or not the value is zero. If P has a value of zero, the video frame is outputted (166) from the global throttler 138 for next stage throttling (i.e. inputted to one of the local throttlers $142_1$-$142_n$).

If however P does not have a value of zero, P is checked (170) to see whether or not the value is one. If P has a value of one, the video frame is dropped (174); however if P does not have a value of one, P becomes the percentage likelihood that the video frame is marked (178) to be dropped/not dropped. In at least some examples, the action 178 may be further understood as follows: keeping in mind that P is some percentage likelihood, first a uniformly distributed random float number n between 0 and 1 is generated. Next, if $n \leq P$, the frame is marked to be dropped. Otherwise the frame is marked to be kept (not dropped).

Next the marking of the video frame is checked (182) and the video frame is dropped or outputted to next stage throttling depending upon whether the video frame is marked to be dropped or not marked to be dropped respectively.

Those skilled in the art will understand that the illustrated method 150 can be continually repeated as long as more video frames continue to arrive (as indicated by flow chart element 176).

Details of a local throttling method in accordance with an example embodiment will now be described.

Listed in Table 2 below are relevant variables for local throttling.

TABLE 2

Relevant Variables for Local Throttling

| Variable | Description |
|---|---|
| R | Maximal Frame Analysis Rate (MFAR) as number of frames (analyzed for LPR) per second (set in throttling policy on a per-lane basis) |
| I | Minimal time interval between frames if frames were arriving with maximal rate of R (i.e. 1/R) |
| Tn | Time at which a frame (numbered n) is processed (in seconds from the epoch time) |
| Tref | Reference time for determining if an incoming frame should be analyzed |

When a frame Tn is passed to the local throttler, the interval between Tn and Tref is calculated as:

$$d = Tn - Tref$$

If $d < T_{ref} + I$, the frame will be dropped (since it has arrived sooner than what R would have allowed) and $T_{ref}$ does not change; otherwise the frame will be accepted for analysis and sent to the LPR Processor, and $T_{ref}$ will be updated to $T_{ref} + I*k$ such that k is the maximal integer that satisfies the following:

$$T_{ref} + I*k \leq T_n.$$

This way we ensure that R is achieved as accurately as possible (versus moving $T_{ref}$ to $T_n$) especially when the camera frame rate is not a multiple of R.

Initially, Tref=0, which means the first frame (with timestamp T1) will always be accepted for analysis.

Figure 4:
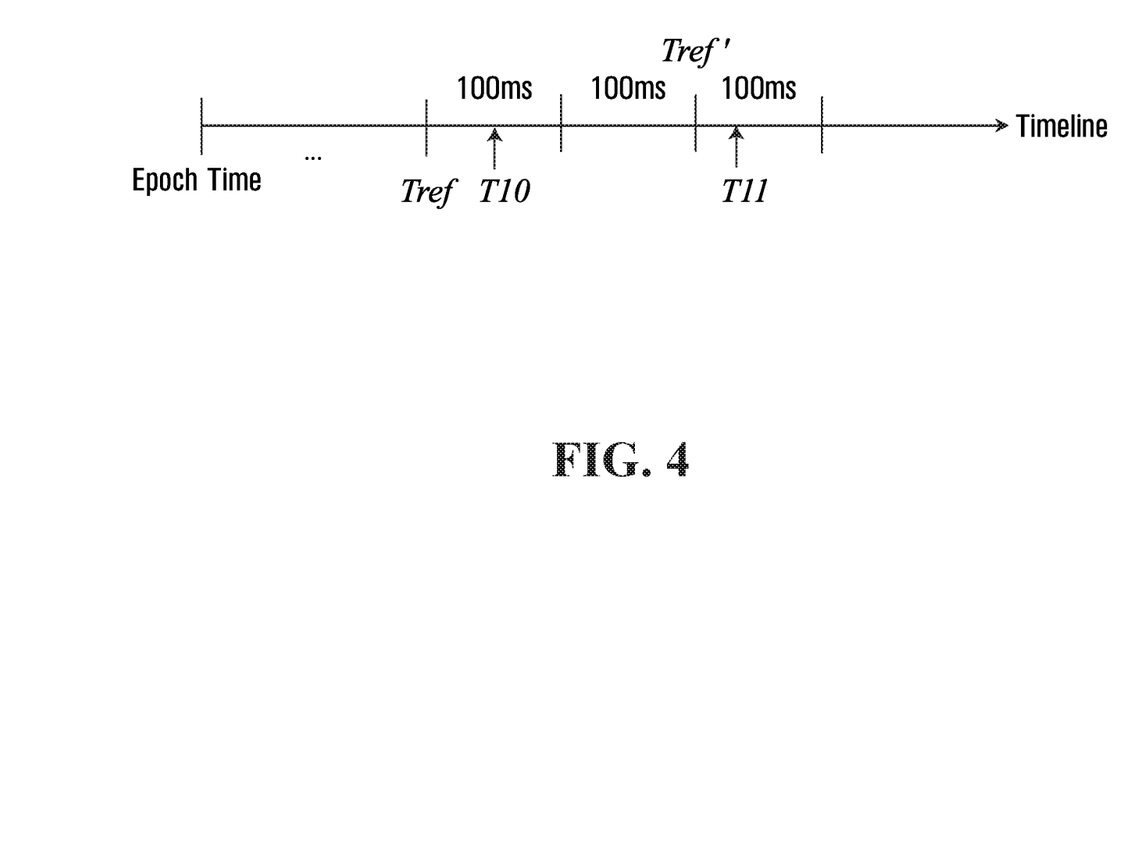
FIG. 4 is a timeline diagram illustrating certain frame arrival times in connection with an example embodiment.

Reference will now be made to FIG. 4 illustrating frame arrival times in connection with the presently described example embodiment. In connection with FIG. 4, it is assumed that R=10 frames/sec, I=1/10 sec=100 ms. Also, Tref in FIG. 4 is the current reference time (as set when processing a previous frame).

Still with reference to FIG. 4, Frame T10 is shown as arriving at Tref+50 ms. Since d=50 ms which is less than the frame analysis interval 100 ms, the frame will be discarded. Tref remains unchanged.

Next, Frame T11 is shown as arriving at Tref+230 ms. Since d=230 ms which is greater than the frame analysis interval 100 ms, it will be accepted for analysis. Tref will be moved to Tref (Tref+200 ms, k=2) and become the new reference time.

Figure 5:
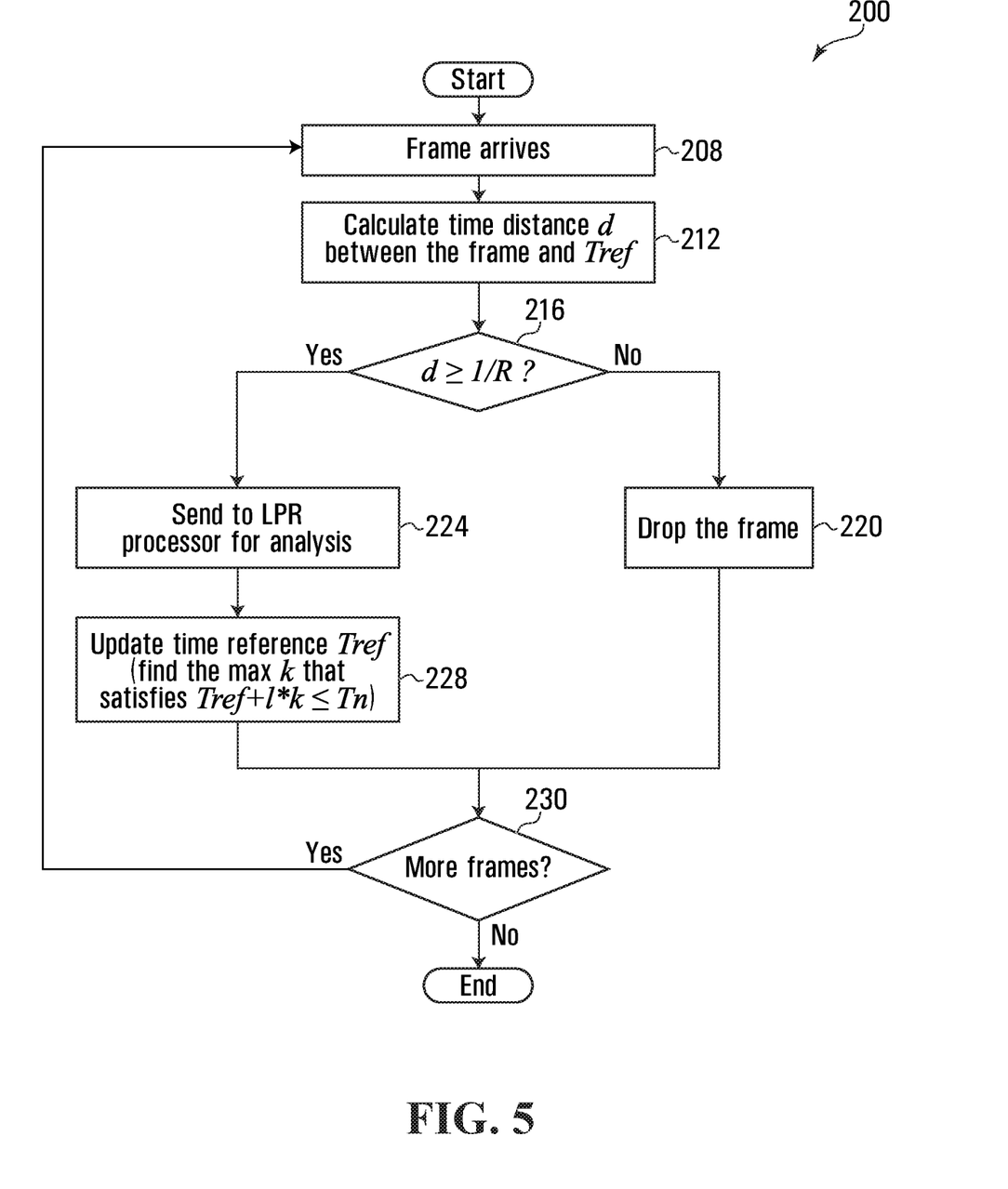
FIG. 5 is a flow chart illustrating a method for dropping frames for local throttling in accordance with an example embodiment.

FIG. 5 is a flow chart of a method 200 for dropping frames for local throttling in accordance with the presently described example embodiment. First, the video frame arrives (208) from the global throttler 138. Next, the time distance d is calculated between the video frame and Tref. The local throttler then checks (216) whether d≥1/R. If "no", the local throttler drops (220) the video frame. If "yes", the video frame is outputted from the local throttler, and thus sent (224) to the LPR processor 124. Following the sending to the LPR processor 124, the local throttler updates (228) the time reference Tref (finds the maximal integer k that satisfies Tref+I*k≤Tn).

LPR knowledge is employed to define and enforce the frame dropping criteria. For the ALPR system 100 illustrated in FIG. 2, not every frame is necessary to detect (and recognize) a license plate, so long as enough frames containing the license plate are analyzed. This permits implementation of a criteria that drop frames randomly or selectively. For example, when the resource threshold is reached, the current frame may or may not be dropped depending on a randomization factor calculated from the threshold. This ensures that there is not constant dropping of continuous frames to meet throttling criteria hence reducing the chance of missing license plates. Frames that pass the first stage will be moved to the next stage for further throttling on a per-LPR lane basis.

Still with reference to FIG. 2, and in particular the second stage of the illustrated TSDT 114, individual LPR lanes are throttled independently to satisfy per-lane frame throttling policies stored in the storage 132. The sequencing of the stages (i.e. second stage after first stage) helps ensure that the whole system is stable before carrying out throttling on a lane.

In accordance with one example throttling policy, frames are regulated so that frames are only processed if they arrive within a certain frame analysis rate, called Maximal Frame Analysis Rate (MFAR). The purpose of this policy is to control the frame analysis rate so that the LPR Processor 124 will not be flooded with more frames than it can handle. MFAR will be configured (and persisted in storage) for each lane depending on the desired frame analysis rate on the LPR lane. The total MFARs for all lanes should not exceed the processing capacity of the LPR Processor 124. This policy must be enforced independently of the frame arrival rate (which is controlled by the camera 104 and used in video recording) and the policy should not be the cause of missing license plates resulting from frames arriving faster than MFAR are dropped. In accordance with at least one example embodiment, an algorithm is employed to achieve the enforcement, and this algorithm is simple and efficient in: i) determining frames to be dropped under the constraint of MFAR; and ii) not dropping frames continuously. Also, part of the algorithm is remembering a reference time that is updated from the processing of the last frame (without having concern for the actual camera frame rate). Further in accordance with the algorithm, in regards to those frames that arrive sooner (i.e. sooner based on elapsed time from the reference time) than what the MFAR allows, those frames will be dropped (noting that a tolerance is introduced to compensate for possible deviations in frame arrival timing): only frames that fall within the set range of MFAR will be allowed to pass the throttling, which helps ensure that no continuous blocks of frames will be dropped. Frames that have survived the TSDT 114 will be eventually sent to the LPR processor 124 for license plate detection and recognition.

With reference again to FIG. 5, those skilled in the art will understand that the illustrated method 200 can be continually repeated as long as more video frames continue to arrive (as indicated by flow chart element 230).

Figure 6:
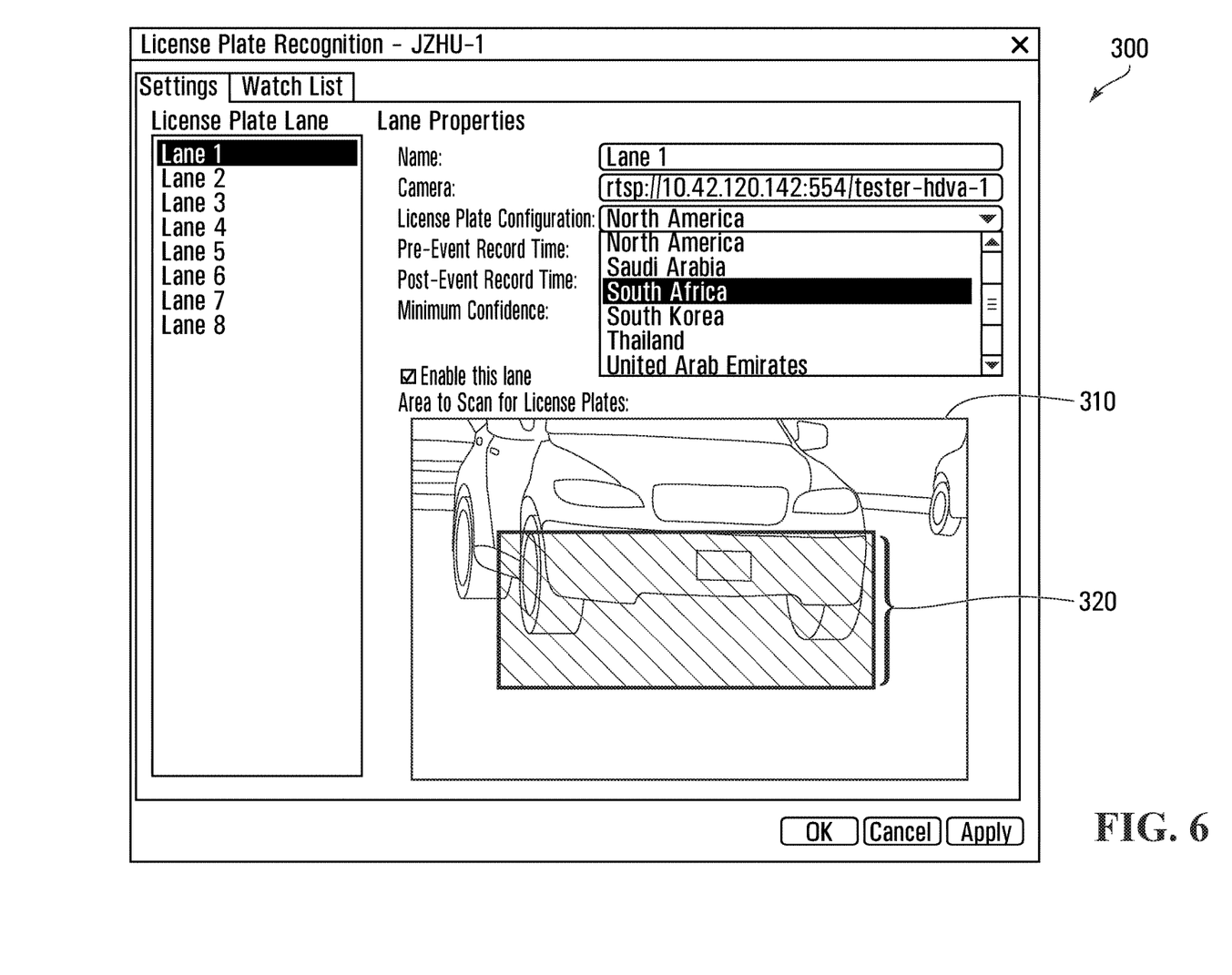
FIG. 6 illustrates a user interface page for controlling LPR-related functions in accordance with an example embodiment.

Reference will now be made to FIG. 6. FIG. 6 illustrates a user interface page 300 for controlling LPR-related functions. In some examples the user interface page 300 is generated when an LPR module (part of a larger VMS system) is run on a client computer (for example, one of the client devices 70 shown in FIG. 1). Within the user interface page 300, region 310 is provided for displaying an image of part of a car including a license plate of that car. Within the region 310 is a Region of Interest (ROI) 320. The ROI 320 is a portion of the image (i.e. less than the whole image itself) and contains the image pixels which make up the license plate of the car. Thus, the ROI 320 defines an area of the overall image within which is found the most important image pixels for the purposes of LPR. As will be understood by those skilled in the art, the image pixels of the ROI 320 are processed to generate license plate data. For example, the image pixels may be processed in an LPR engine of the LPR appliance 50 (as previously herein described in connection with FIG. 1).

Figure 7:
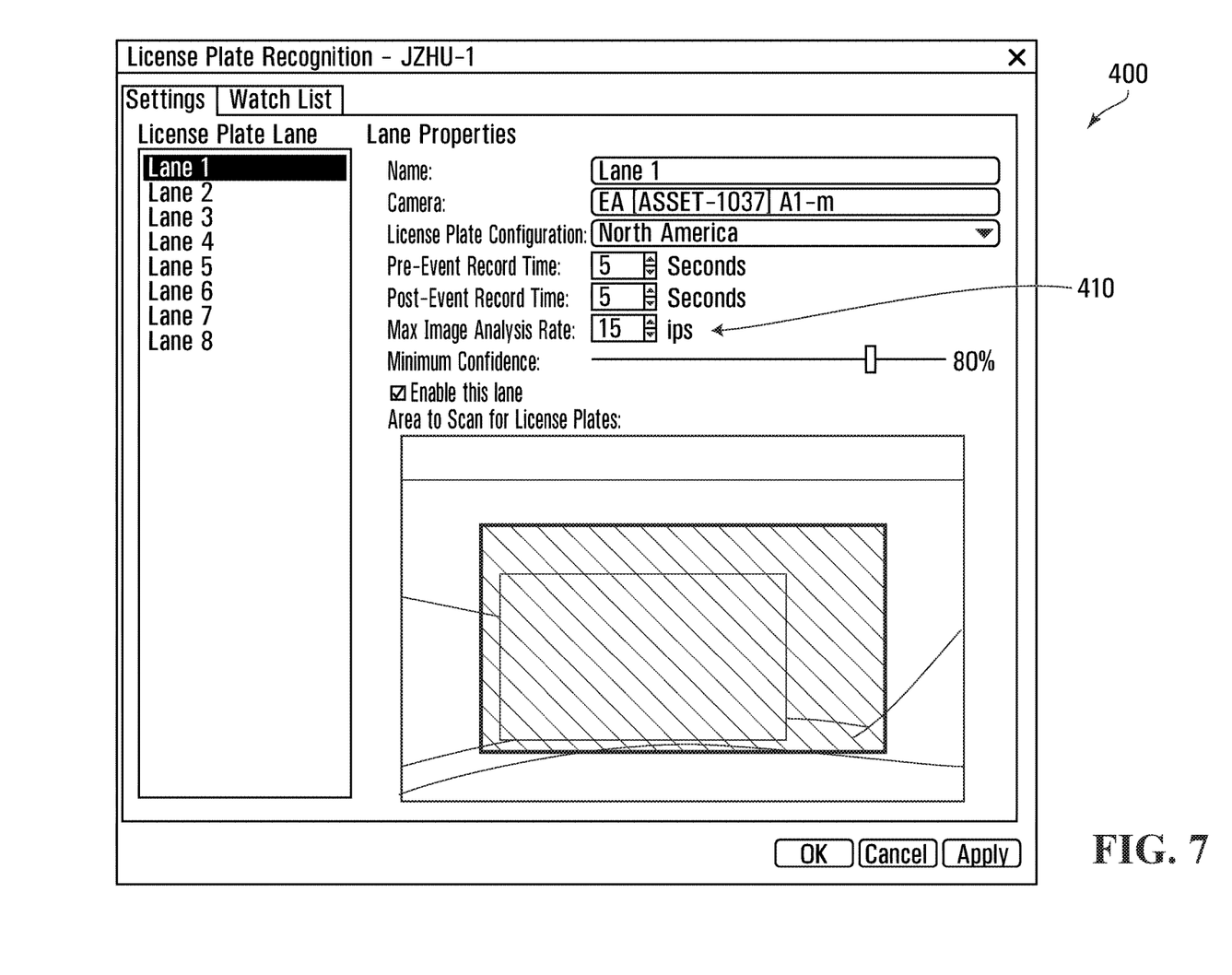
FIG. 7 illustrates another user interface page for controlling LPR-related functions in accordance with an example embodiment.

Reference will now be made to FIG. 7, which illustrates another user interface page 400 (which can be generated by, for example, the same LPR module which generates the previously described user interface page 300). Like the user interface page 300, the user interface page 400 is for controlling LPR-related functions in accordance with an example embodiment. The user interface page 400 includes a UI element 410 for "Max Image Analysis Rate" to control MFAR which in turn controls local throttling as herein previously described. A user of the client device can manipulate the UI element 410 to change the "Max Image Analysis Rate" (for example, the value is shown as "15" in FIG. 7 and by manipulating the UI element 410 the user could increase or decrease that value to any suitable new integer value).

Certain adaptations and modifications of the described embodiments can be made. For example, user interface pages shown in the drawings (FIGS. 6 and 7) can be generated from application software run on a processor installed on a client terminal; however in some alternative example embodiments implementation of the UI and associated interface pages can be achieved with less installed software through the use of a web browser application. A web browser application is a program used to view, download, upload, surf, and/or otherwise access documents (for example, web pages). In some examples, the browser application may be the well-known Microsoft® Internet Explorer®. Of course other types of browser applications are also equally possible including, for example, Google® Chrome™. The browser application reads pages that are marked up (for example, in HTML). Also, the browser application interprets the marked up pages into what the user sees rendered as a web page. The browser application could be run on a computer terminal to cooperate with software components on the VMS server 40 in order to enable a computer terminal user to carry out actions related to providing input in order to facilitate LPR-related functions. In such circumstances, the user of the computer terminal is provided with an alternative example user interface through which the user inputs and receives information.

Therefore, the above discussed embodiments are considered to be illustrative and not restrictive, and the invention should be construed as limited only by the appended claims.

The invention claimed is:

1. An automatic license plate recognition system for deployment within n lanes of vehicle traffic, where n is an integer greater than one, the system comprising:
    n cameras, each of the n cameras configured to monitor a respective one of the n lanes of vehicle traffic and generate video data;
    a video management system communicatively coupled to the n cameras to receive the video data therefrom, the video management system including at least one tangible, non-transitory, computer-readable storage medium having instructions encoded therein, wherein the instructions, when executed by at least one processor, cause a carrying out of a two-stage restricting method, wherein an output of a first stage of the two-stage restricting undergoes additional restricting in a second stage of the two-stage restricting such that receiving and non-receiving, by the second stage, of individual ones a plurality of video frames, derived from the video data, is controlled by the first stage, and wherein the two-stage restricting method includes:
    first dropping, in the first stage of restricting, a subset of the plurality of video frames; and
    second dropping, in the second stage after the first stage, a further subset of the plurality of video frames to effect controlled frame input into a processor that performs at least one recognition analytic on remaining video frames of the plurality of video frames, the dropping of the further subset based on at least one drop condition including a lane-specific drop condition.

2. The automatic license plate recognition system as claimed in claim 1 further comprising at least one network coupled between the n cameras and the video management system, and wherein the video management system further includes a video processor at an interface to the at least one network, the video processor configured to receive the video data.

3. The automatic license plate recognition system as claimed in claim 2 wherein the at least one processor includes a license plate recognition processor forming part of the video management system.

4. The automatic license plate recognition system as claimed in claim 3 wherein the video management system further includes a video management system server and a license plate recognition appliance, and the video processor and the license plate recognition processor form a part of the video management system server and the license plate recognition appliance respectively.

5. The automatic license plate recognition system as claimed in claim 1 wherein the at least one processor includes a license plate recognition processor forming part of the video management system.

6. The automatic license plate recognition system as claimed in claim 1 wherein the first dropping of the subset of the plurality of video frames occurs independently of any lane-specific drop condition.

7. The automatic license plate recognition system as claimed in claim 1 wherein an acuteness of the first dropping of the subset of the plurality of video frames is impacted by a current state of use of memory allocated to support video frame processing.

8. A method of dropping video frames in an n-lane automatic license plate recognition system, where n is an integer greater than one, the method comprising:
    receiving, at an input of a first stage of a two-stage restrictor, a plurality of video frames;
    in the first stage, dropping a subset of the plurality of video frames, wherein an output of the first stage is coupled to an input of a second stage of the two-stage restrictor such that receiving and non-receiving of individual ones the plurality of video frames by the second stage is controlled by the first stage; and
    in the second stage after the first stage, dropping a further subset of the plurality of video frames to effect controlled frame input into a processor that performs at least one recognition analytic on remaining video frames of the plurality of video frames, the dropping of the further subset based on at least one drop condition including a lane-specific drop condition.

9. The method as claimed in claim 8 further comprising, prior to the receiving, outputting the plurality of video frames from a decoder.

10. The method as claimed in claim 8 wherein the dropping of the subset of the plurality of video frames in the first stage is independent of any lane-specific factors.

11. The method as claimed in claim 8 wherein an acuteness of the dropping in the first stage is impacted by a current state of use of memory allocated to support video frame processing.

* * * * *